(No Model.)

A. MAGINOT.
SINGLE OR CONNECTED HELICO CENTRIFUGAL PUMP.

No. 576,870.  Patented Feb. 9, 1897.

Witnesses
H. van Oldenneel
E. A. Scott

Inventor
Albert Maginot
by Richards
Attorneys

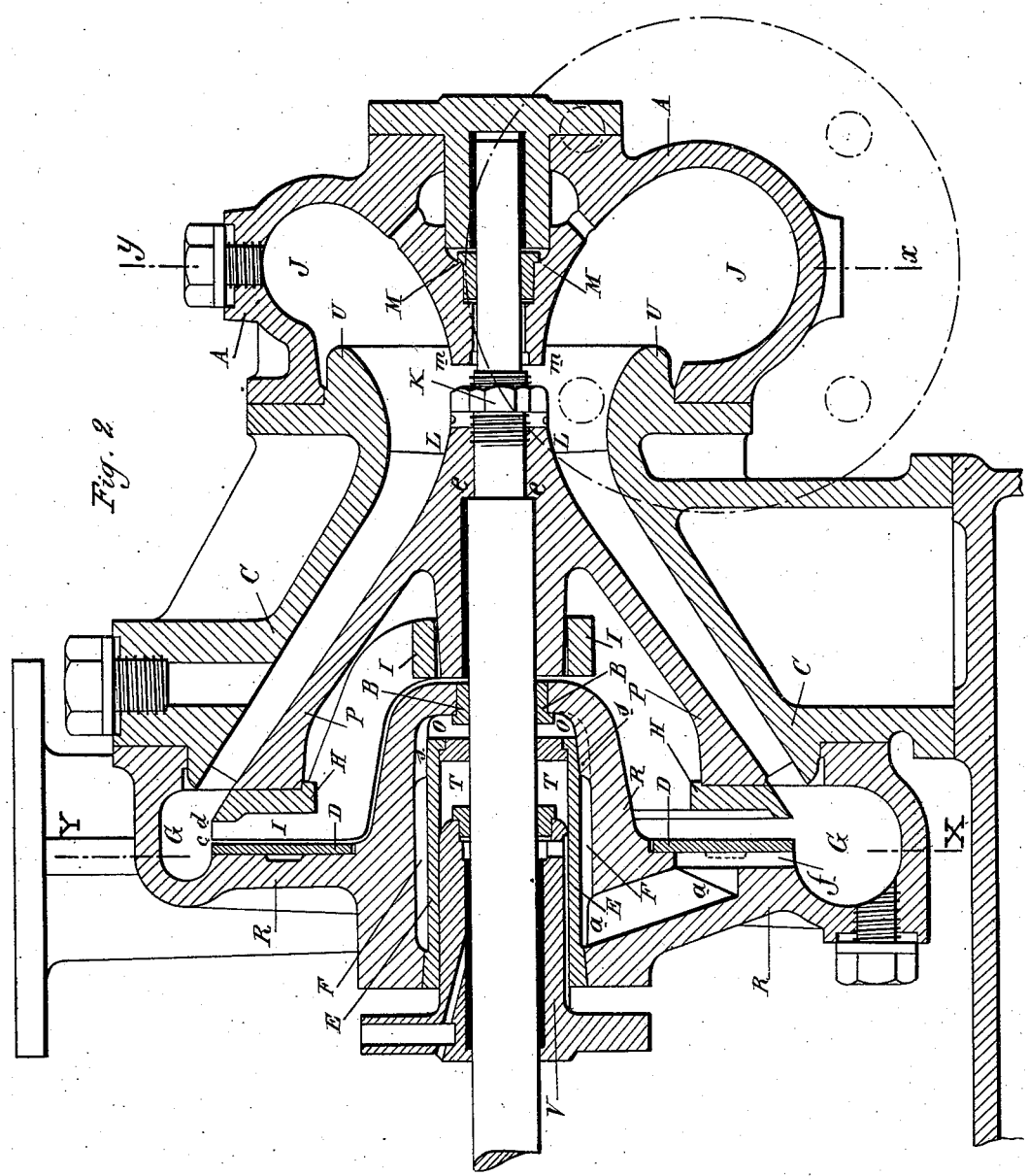

(No Model.) 7 Sheets—Sheet 3.

A. MAGINOT.
SINGLE OR CONNECTED HELICO CENTRIFUGAL PUMP.

No. 576,870. Patented Feb. 9, 1897.

Witnesses
H. van Oldenneel
E. A. Scott

Inventor
Albert Maginot
by Richardo
Attorneys

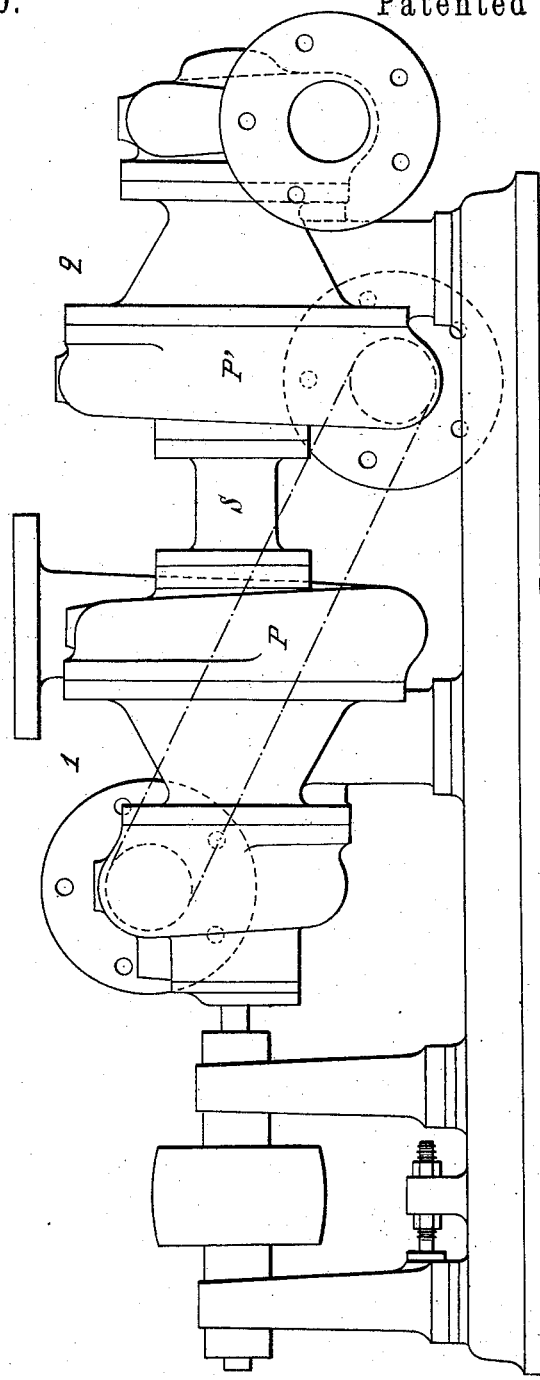

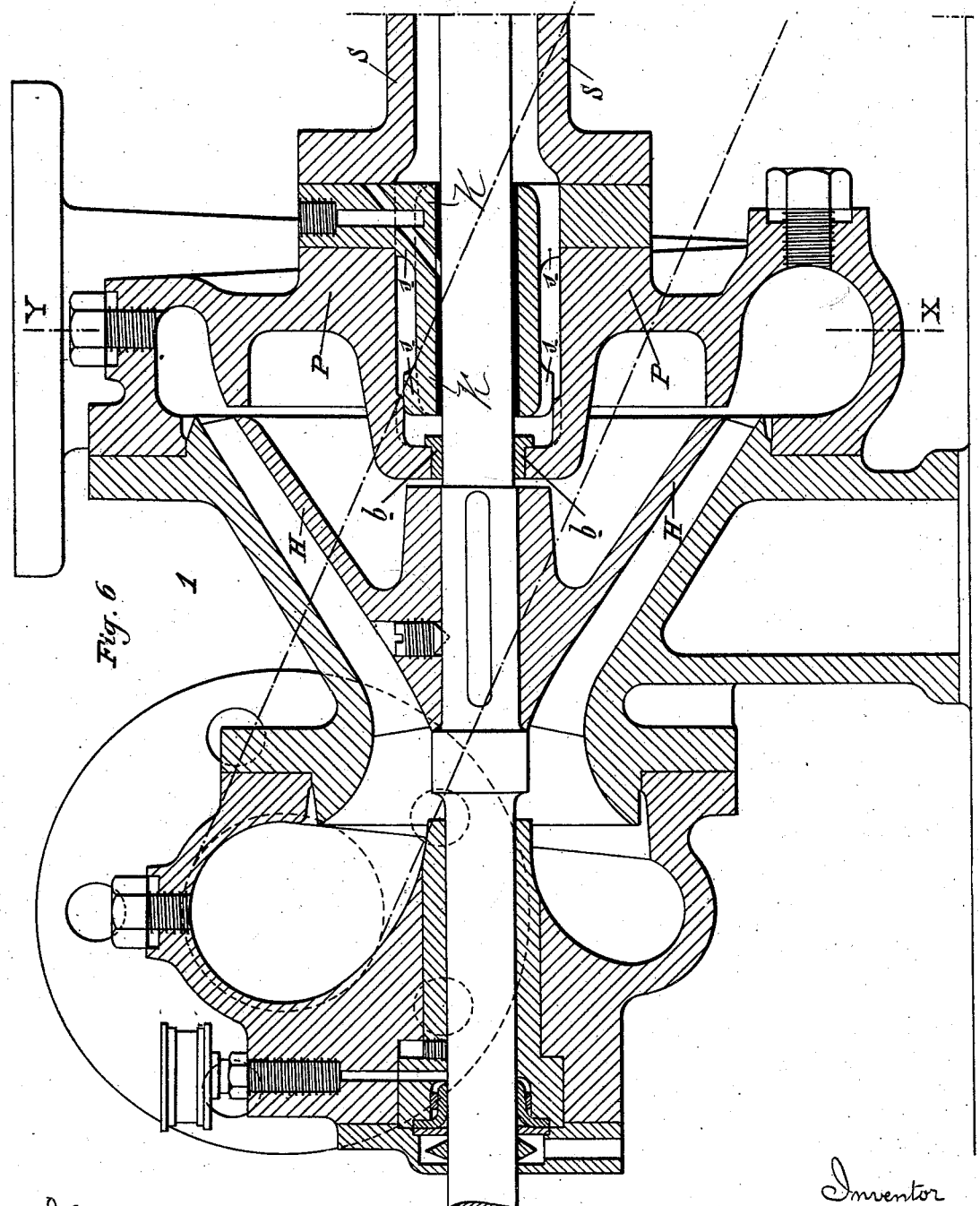

(No Model.) 7 Sheets—Sheet 6.
A. MAGINOT.
SINGLE OR CONNECTED HELICO CENTRIFUGAL PUMP.
No. 576,870. Patented Feb. 9, 1897.
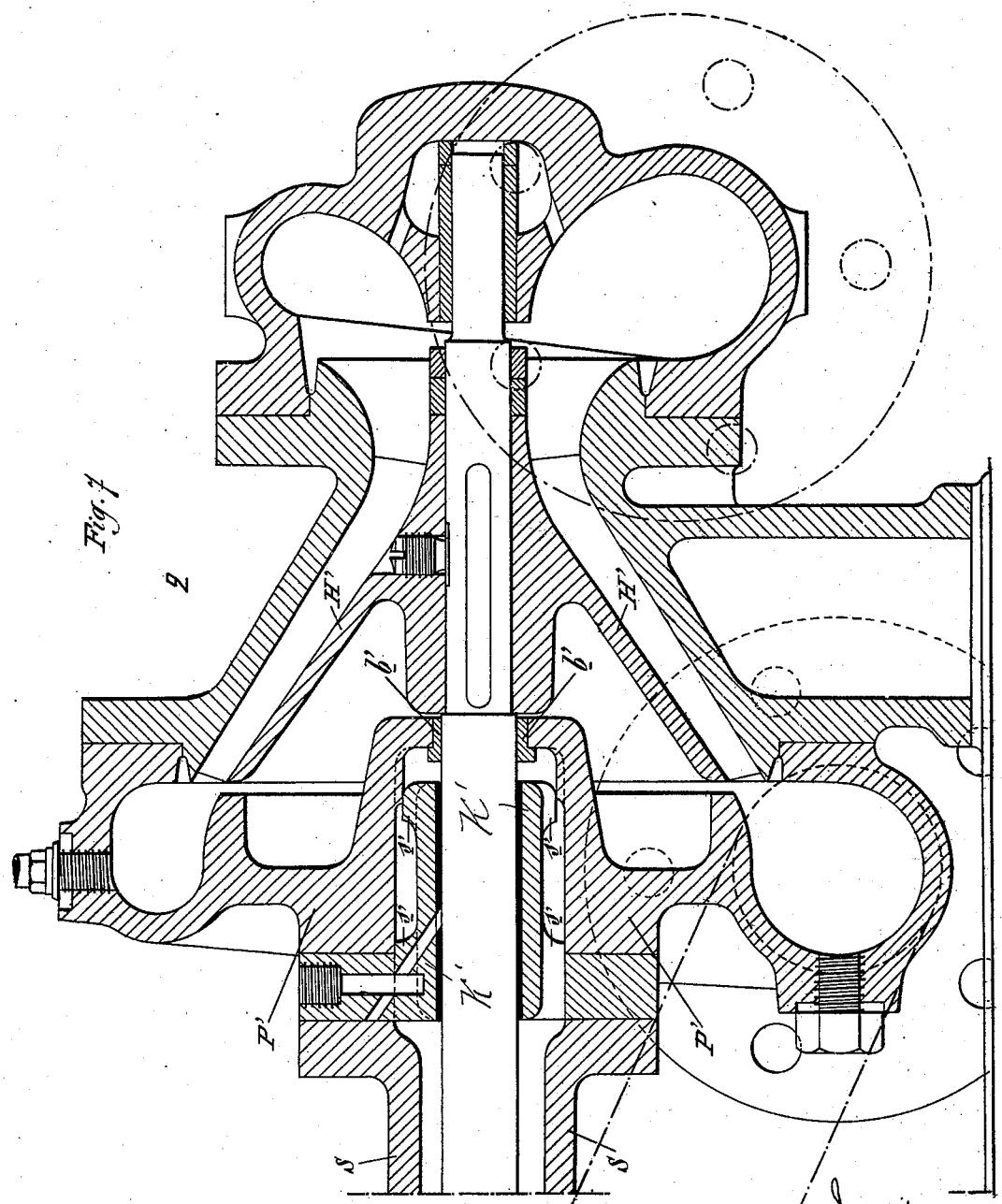
Witnesses
H. van Oldenneel
E. A. Scott
Inventor
Albert Maginot
by Richardson
Attorneys

UNITED STATES PATENT OFFICE.

ALBERT MAGINOT, OF VESOUL, FRANCE.

SINGLE OR CONNECTED HELICO-CENTRIFUGAL PUMP.

SPECIFICATION forming part of Letters Patent No. 576,870, dated February 9, 1897.

Application filed January 31, 1896. Serial No. 577,576. (No model.) Patented in France December 15, 1891, No. 218,001, and March 15, 1894, No. 236,999.

*To all whom it may concern:*

Be it known that I, ALBERT MAGINOT, a citizen of the French Republic, residing at Vesoul, in the Department of the Haute-Saône, France, have made certain new and useful Improvements in Single or Connected Helico-Centrifugal Pumps, of which the following is a specification.

This invention has been patented in France, No. 218,001, dated December 15, 1891, and No. 236,999, dated March 15, 1894.

My invention relates to helico-centrifugal pumps; and it consists of a number of improvements therein.

Figure 1:
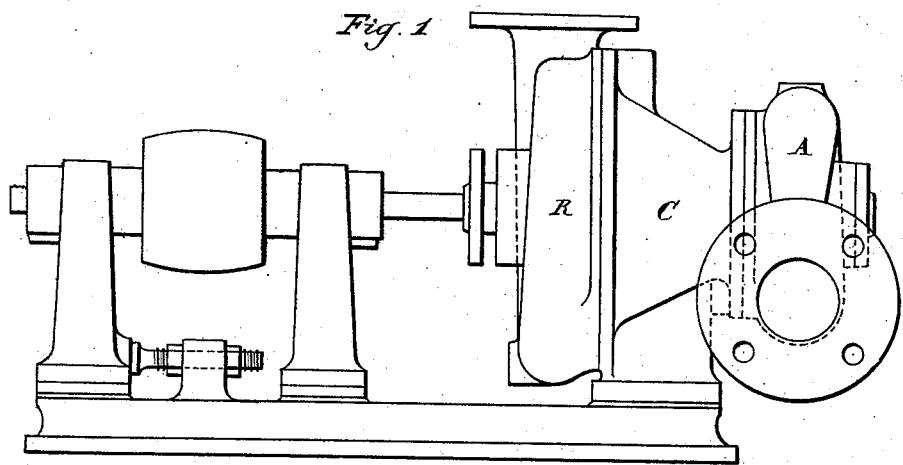
Figure 4:
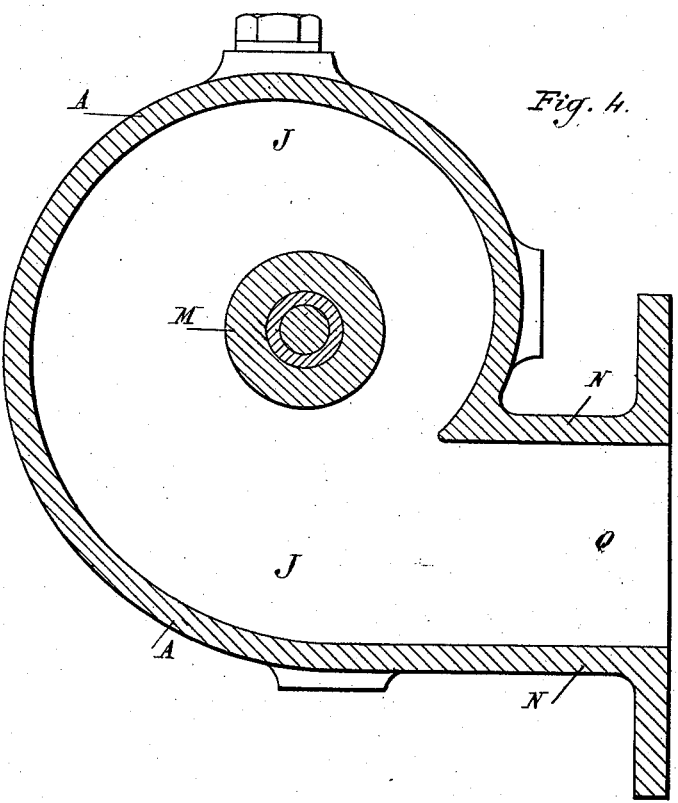
Figure 3:
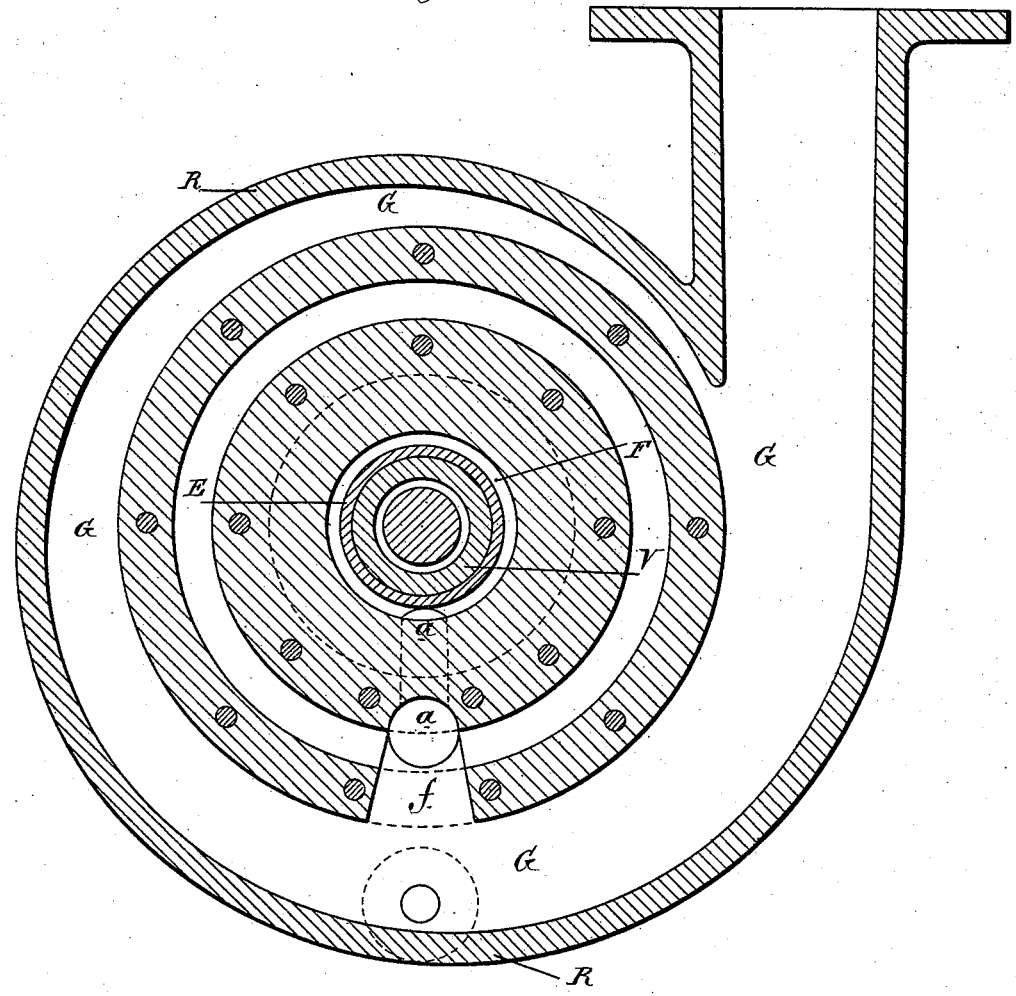
Figure 8:
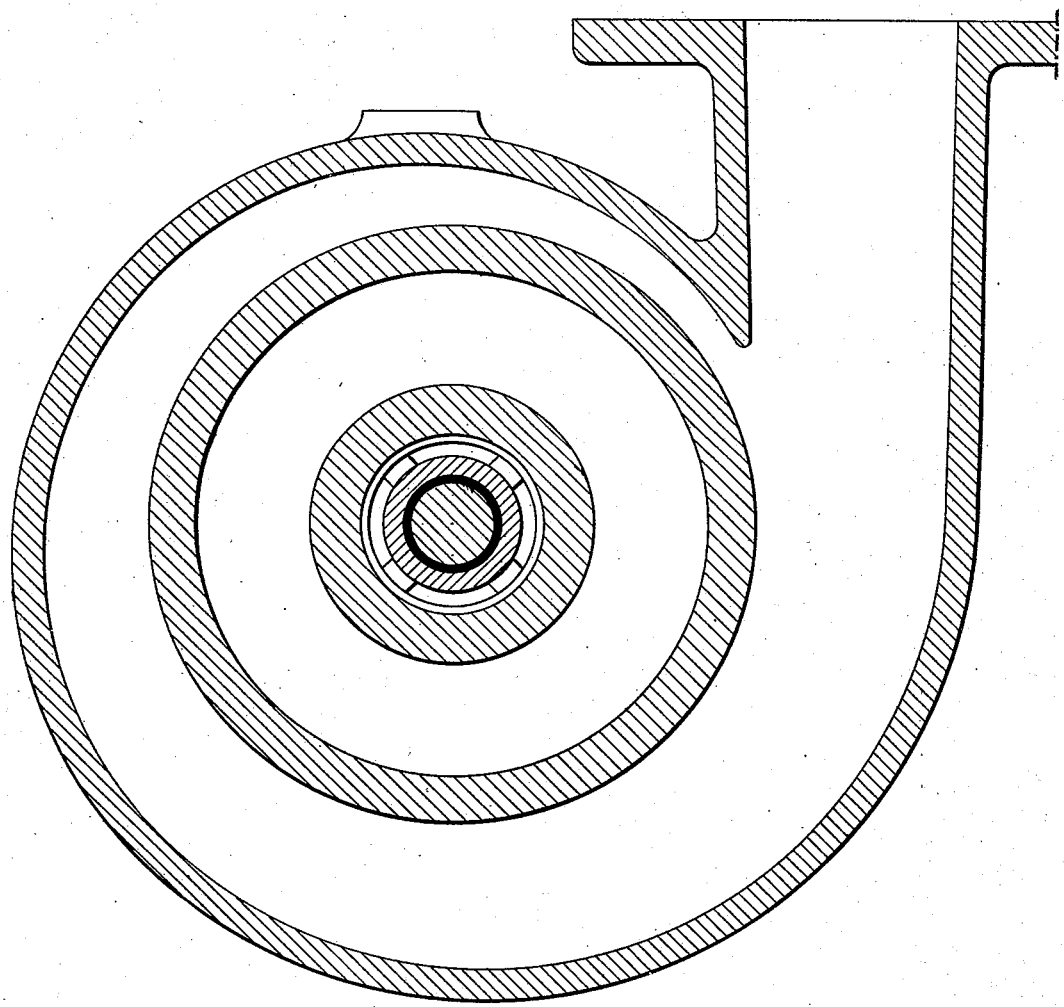

In the accompanying drawings, Figure 1 is an elevational view of a single helico-centrifugal pump of my invention. Fig. 2 is a sectional elevation, on a larger scale, of the body itself of the pump. Fig. 3 is a transverse sectional view on the line X Y of Fig. 2. Fig. 4 is a transverse sectional view on the line $x\ y$ of Fig. 2. Fig. 5 is an elevation of the whole of a connected pump. Figs. 6 and 7, respectively, are longitudinal sectional views, on a larger scale, of the pump-bodies 1 and 2 of Fig. 5. Fig. 8 is a transverse sectional view on the line X Y of Fig. 6.

The improvements consist of:

First. A system of paddles I I, Fig. 2, placed inside of the nave P P of the propeller and cast of one piece, with a ring H H fixed upon the edge of said nave. These paddles are put in motion by the propeller and turn in juxtaposition with and as near as possible to a disk D D, of copper or galvanized sheet-iron, having a diameter at least as large as their spread and fixed upon the bottom of the forcing-body R R. The rotary motion of the paddles will produce in the entire mass of water they stir a reduction of pressure or partial vacuum, depending upon the size of their spread and calculated in each case to compensate totally or partly the reduction of pressure or partial vacuum existing in the mass of water comprised between the nave P P and the envelop C C of the propeller. The longitudinal reaction upon the motive shaft and thus the effort upon the abutment are attenuated or annulled, for it will be seen that the action of the vertical edges of the paddles I upon the water, together with the action of the inner edge of the paddles, will create an end thrust opposite to that created by the outer paddles of the nave P. The projection $c\ d$ of the paddles I I upon the disk H H must be small in order to reduce as much as possible the waste work.

Second. In general in the centrifugal pumps which absorb water only through one cheek the pump-body C C is united with the aspiring-tube by means of a straight or elbowed connection, and it has never been attempted to adapt to the same the spiral aspiring device used in centrifugal pumps which absorb water through both cheeks. In my improved arrangement the water-absorbing orifice of the pump-body is widened in the shape of a bell-mouth U U, Fig. 2, in which the water of aspiration arrives, following the entire circumference of a spirally-shaped neck J J, having a form similar to that of the neck G G of the forcing-body R R, and having a straight prolongation that carries the aspiring-flange, Fig. 4. Thus it will be seen that my spiral aspiring-body A A, bolted with a socket-joint upon the pump-body C C, is removable and adjustable in all directions in a plane perpendicular to the axle of rotation of the propeller, and besides does not encumber the pump.

Third. A special arrangement of stuffing-boxes with hydraulic calking, insuring at the same time the circulating of refrigerating water around the stuffing-box. As can be seen in Fig. 2, the water of the forcing-body arrives through the notch $f$ and the channel $a\ a$ into the annular space F F existing between the ring, with thin walls E E, and thus prevents heating of the stuffing-box bearing V V and of the stuffing-box T T impossible. The water will then pass through the spaces left open between the grooves $s\ s$ to reach the back of the stuffing-box in the chamber O O, where it transmits the pressure existing in the forcing-body, thus insuring the hydraulic calking, whereafter it is carried through the space existing between the motive shaft and the ring B B. Besides, the sections of the successive passages $f\ a\ a$ and of the free spaces between the grooves $s\ s$ are large enough to make the speed of circulation of the water very slow, so that the pressure of the forcing-body is almost entirely transmitted to the rear of the stuffing-box.

Fourth. An improved method of wedging the propeller upon its shaft. The seat L L of the nave C C of the propeller has been enlarged, so as to permit the use of a solid fastening-nut K, insuring the fixing of the propeller concurrently with the shoulder e e of motive shaft. On the other hand, in order that the nut may not interfere with the water running into the propeller the hub M M of the aspiring-body A A is made longer, so that its edge m m comes as near as possible to the nut K, while said edge has a diameter slightly larger than that of the seat L L of the nave of the propeller, so as to mask or cover the nut. The considerable increase in the diameter of the seat L L and the elongation of the hub M M of the aspiring-body fill out a zone around the motive shaft at a point where it is of benefit on account of the swells resulting by the action of the water as it comes out of the aspiring-body.

Fifth. A new system of mounting connected pumps. The heads of the two connected pumps P and P', Figs. 5, 6, and 7, are brought near each other and connected by means of a central coupling-box S S, through which the common shaft passes. The driving-pulley or the coupling-disk when there is a direct driving is located outside of the pumps. The two stuffing-boxes of the forcing-bodies which were absolutely necessary in the old system, where the driving device was placed between the two pumps, are omitted. The shaft is shorter, and where the driving is done directly the motor, which is outside of the pumps, is more accessible than if it were placed between the same, in which case one coupling-disk for each pump would be required. The two connected pumps form practically only one complete pump.

Figs. 6 and 7 show a longitudinal section of the two parts of my arrangement of connected pumps. It will be noticed that the two propellers H H and H' H' being symmetrical there will be no resultant of pressure following the motive shaft, which renders unnecessary the use of paddles required with a single pump, described hereinbefore.

The absence of stuffing-boxes and the great difference of pressure existing in the two forcing-bodies permit the water to pass from the forcing-pump, where the pressure is highest, into the aspiring-pump, traversing successively the space between the shaft on one side and the ring b b and the ring b' b' on the other side. In order to prevent the circulation of the water along the shaft, which would carry along very fine sand and other very tiny substances which would penetrate between the points of friction and would wear out the bearings rapidly, I have made wide passages between the grooves s s s' s' and between the inside wall of the coupling-box S S and the motive shaft an annular space of sufficient size so that the water can circulate from one pump to the other through all those passages only with imperceptible speed, which enables me to obtain at the two extremities the same pressure—namely, that of the forcing-pump.

It is even possible to use for the inside bearings compression-lubricators without fearing to have the grease driven out of the frictional points.

I claim—

1. In a centrifugal pump, a shaft, a body R, the rotary pump, the casing containing the same of which the body R forms a part, the stuffing-box in said body, the thin walls E about the same, the chamber F about said wall and the water-packing chamber O about the shaft at the end of the stuffing-box, the passage leading to the chamber F for cooling the stuffing-box and the passages S from the chamber F to the chamber O, substantially as described.

2. In combination, in a centrifugal pump, the shaft, the rotary nave P, the part L thereof, a nut at the end of said part to hold the nave to the shaft and the aspiring-casing A, having the inwardly-extending hub M, with its edge m adjacent to the outer edge of the nut to direct the water past the same without obstruction, the said shaft extending beyond the edge m and bearing in the inwardly-extending hub M, substantially as described.

3. In combination in a centrifugal pump, a central shaft, the two sets of paddles on conical naves, said naves being placed in reversed position in respect to each other, the casings surrounding the naves, the inlets to and from the casings, and a central coupling-box uniting the heads, said box forming also a water-passage from one pump to the other, substantially as described.

4. In combination, a central shaft, a pair of pumps comprising the paddles on said shaft and the casings about said paddles and shaft, and the central connecting-sleeve about the shaft and secured at its opposite ends to the two casings, said sleeve forming a water-passage between the two casings, substantially as described.

In witness whereof I have hereunto set my hand in presence of two witnesses.

ALBERT MAGINOT.

Witnesses:
CLYDE SHROPSHIRE,
JULES FAYOLBY.